United States Patent [19]

Bachschmid et al.

[11] Patent Number: 4,773,225
[45] Date of Patent: Sep. 27, 1988

[54] METHOD AND APPARATUS FOR THE CHARGING-PRESSURE-DEPENDENT CONTROL OF A TURBOCHARGER IN AN INTERNAL COMBUSTION ENGINE

[75] Inventors: Reiner Bachschmid, Kernen; Horst Hanauer, Weinstadt; Manfred Fortnagel, Korb; Klaus Blumensaat, Loewenstein-Reisach, all of Fed. Rep. of Germany

[73] Assignee: Daimer-Benz Aktiengesellschaft, Stuttgart, Fed. Rep. of Germany

[21] Appl. No.: 75,729

[22] Filed: Jul. 20, 1987

[30] Foreign Application Priority Data

Jul. 18, 1986 [DE] Fed. Rep. of Germany ....... 3624248

[51] Int. Cl.[4] .............................................. F02D 23/00
[52] U.S. Cl. ........................................ 60/603; 60/602
[58] Field of Search ................... 60/602, 603, 600, 601

[56] References Cited

U.S. PATENT DOCUMENTS 2,281,987  5/1942  Oswald ................................. 60/603
4,513,571  4/1985  Jenny et al. ........................... 60/603

FOREIGN PATENT DOCUMENTS 2943729  5/1981  Fed. Rep. of Germany ..
60-56127  4/1985  Japan .

OTHER PUBLICATIONS

*Automotive Engineering,* Sep. 1985, pp. 70–72.
"Model Year 1985 Passenger Cars USA Version", Service Manual of Mercedes–Benz North America, Inc., (MBNA, Inc.).

*Primary Examiner*—Stephen F. Husar
*Attorney, Agent, or Firm*—Barnes & Thornburg

[57] ABSTRACT

A method and apparatus for the load-dependent control of a turbocharger which is arranged in an internal combustion engine, a turbocharger includes an adjustable turbine guide apparatus which is adapted to be moved by way of an adjusting drive in the direction closing position or in the direction opening position. In order to be able to keep the response time of the turbocharger minimal during positive load changes with an optimum fuel consumption, the turbine guide apparatus is initially guided along a first predetermined characteristic curve in the direction closing position and subsequently in dependence on the charging pressure increase conditioned on the load increase according to a second predetermined characteristic curve again in the opening direction.

14 Claims, 1 Drawing Sheet

METHOD AND APPARATUS FOR THE CHARGING-PRESSURE-DEPENDENT CONTROL OF A TURBOCHARGER IN AN INTERNAL COMBUSTION ENGINE

BACKGROUND AND SUMMARY OF THE INVENTION

The present invention relates to a method and apparatus for the load-dependent control of a turbocharger which is arranged at an internal combustion engine and includes an adjustable turbine guide apparatus.

It is known from the DE-OS No. 29 43 729 to control the turbine guide apparatus of a turbocharger in such a manner that it is guided in the transition from the lower into the middle load range from the open position into the closed position where it remains up to the transition from the middle into the upper load range in order subsequently to be brought again into the open position. This type of control entails the disadvantage that the turbocharger responds poorly during positive load changes, that is, especially with a change from the lower into the upper load range i.e., a relatively large time span elapses until the compressor has built up the charging pressure corresponding to the injected fuel quantity.

Furthermore, an arrangement is illustrated in the work shop manual of the assignee of the present invention "Model Year 1985 Passenger Cars USA Version" in the chapter "Models 107, 123, 126, 201 Page 103" which produces in dependence, inter alia, of the engine load and the charging pressure, a vacuum for the control of an automatic transmission by means of a pneumatically operating pressure converter. However, nothing is said in the aforementioned literature about how the turbine guide apparatus of a turbocharger could or should be controlled.

The present invention is concerned with the task to indicate a method of the aforementioned type, by means of which the response time of a turbocharger can be kept minimal in case of a positive load change, yet an optimum fuel consumption is assured nonetheless.

The underlying problems are solved according to the present invention in that the turbine guide apparatus in case of a positive load change is guided initially according to a first predetermined characteristic curve in the direction closed position and subsequently in dependence on the charging pressure increase conditioned on the load increase according to a second predetermined characteristic curve again in the direction open position.

The fact that the turbine guide apparatus is guided initially in the direction closed position with a positive load change, i.e., with an increase of the load, has as a consequence that, on the one hand, the flow velocity of the exhaust gases against the turbine blades is increased and, on the other, the flow direction of the exhaust gases against the turbine blades is optimized.—Closed position designates the position of the turbine guide apparatus in which the same opens up a minimum cross section for the exhaust gases for acting on the turbine blades; analogous thereto in the open position, a maximum cross section is opened up.—Thus, the best prerequisites exist on the turbine side to accelerate the turbocharger as rapidly as possible. To displace the turbine guide apparatus again in the direction open position during the subsequent following phase in which the charging pressure increases, offers the advantage that as a result of the now naturally increasing exhaust mass flow, the dynamic pressure ahead of the turbine cannot become too large at any point in time by reason of too small a flow cross section, as a result of which the fuel consumption also remains minimally.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
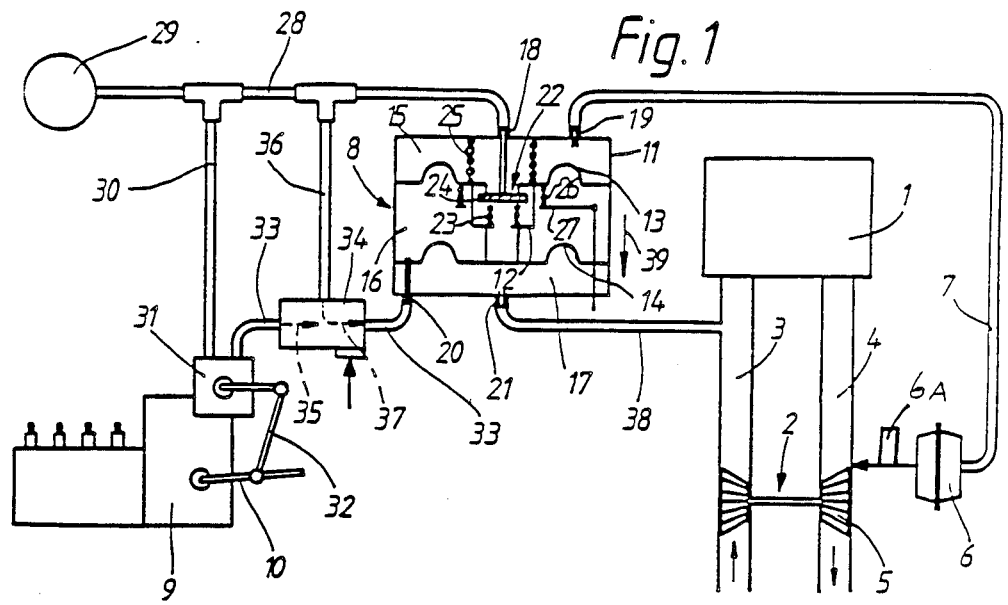
FIG. 1 is a schematic view illustrating in principle one embodiment of an installation for carrying out the method in accordance with the present invention.

Referring now to FIG. 1 of the drawing, this figure illustrates a diesel internal combustion engine 1 which is supercharged by means of a turbocharger generally designated by reference numeral 2 which includes a charging air line 3, and an exhaust gas line 4. The turbine component 5 of the turbocharger 2 is provided with an adjustable guide apparatus 6a which is actuatable by a pneumatically actuated adjusting drive 6. The guide apparatus can thereby assume any position between the closed position in which the turbine blades are acted upon by the exhaust gas only by way of a minimum cross section, and the open position in which the flow cross section is maximum.

The adjusting drive 6 is acted upon by way of a vacuum line 7 by a control vacuum $p_{VTG}$, which is produced by a pneumatically operating pressure converter generally designated by reference numeral 8 in dependence on the position of the adjusting lever 10 arranged at the injection pump 9 of the internal combustion engine 1 and by the pressure $p_L$ in the charging air line 3.

The pressure converter 8 itself consists of a housing 11 in which two diaphragms 13 and 14 rigidly connected with each other by way of a coupling element 12 form three control spaces 15 to 17 which are delimited by the housing 11. The diaphragm 13 thereby possesses a larger area than the diaphragm 14. Four pneumatic connections 18 to 21 are provided at the housing 11 of which the connections 18 and 19 lead to the control space 15, the connection 20 to the control space 16 and the connection 21 to the control space 17. The diaphragm 13 includes an opening 22 which is adapted to be closed by a valve plate 24 supported at the coupling element 12 by means of a spring 23. Furthermore, also the connection 18 can be closed by the valve plate 24. The diaphragm 13 is supported at the housing upper part by way of a regulating spring 25. An adjusting spring 26 abuts at the bottom side of the diaphragm 13 whose prestress is adapted to be influenced from the outside by an adjustable abutment or stop 27.

The pressure converter 8 is directly connected with a vacuum pump 29 by way of the vacuum line 28 which is arranged at the connection 18. A vacuum line 30 branches off from the line 28 to a vacuum control valve 31 arranged at the injection pump 9 which is operatively connected with the adjusting lever 10 of the injection pump 9 by way of a linkage 32. The vacuum produced by the vacuum pump 29 is modulated by the vacuum control valve 31 depending on the adjusting lever position (for example, by a corresponding venting) and is fed to the control space 16 of the pressure converter 8 by way of the vacuum line 33 which is provided at the connection 20. The vacuum modulation takes place thereby in such a manner that with an increasing adjusting lever deflection, i.e., with increasing fuel injection quantity, also the vacuum $p_{USV}$ which is supplied to the pressure converter 8 by way of the connection 20 becomes larger. However, the vacuum control valve is so designed that the vacuum in the control space 16 remains smaller than that in the control space 15 at any point in time, even at full load.

Additionally, an electronically controllable solenoid valve 34 is arranged in the line 33 which, as needed, either directly connects the connection 20 either with the vacuum control valve 31 (arrow 35 in the valve 34) or separates the first part of the line 33, i.e., closes off the same and establishes a connection to the vacuum pump 29 by opening the line 36 which also branches off from the line 28 (arrow 37 in the valve 34). In order also to take into consideration the influence of the charging pressure $P_L$, a further pneumatic line 38 branches off from the charging air line 3, by way of which the control space 17 of the pressure converter 8 is acted upon with the charging pressure $P_L$. The adjusting drive 6 is so designed that it displaces the turbine guide apparatus in the direction closed position with an increasing vacuum in the line 7 and vice versa.

Owing to the construction of the pressure converter 8, a force equilibrium results in a stationary operating point between, first, the resulting diaphragm force from the vacuum modulated in the vacuum control valve 31 which, by reason of the larger surface of the diaphragm 13, acts in the direction of arrow 39, second, the force acting on the diaphragm 14 opposite the arrow direction 39 from the charging pressure $P_L$, third, the force on the upper diaphragm 13 from the vacuum existing at the adjusting drive 6 which acts opposite the arrow direction 39 and fourth, the resultant acting in the direction of arrow 39 from the regulating spring force and the adjusting spring force.

If the vacuum existing at the connection 20 becomes greater, i.e., if the injection quantity is increased, then the diaphragm system moves in the direction of arrow 39 as a result of the differently large diaphragm surfaces, whereby the valve plate 24 is lifted off from the connection 18, and the vacuum in the control space 15 as also the vacuum existing at the adjusting drive 6 become larger. The valve plate 24 remains lifted off from the connection 18 for such length of time until the prevailing vacuum in the control space 5 is so large that again a force equilibrium exists. If, for example, the charging pressure $P_L$ now increases, then the diaphragm system is forced in the upper direction opposite the arrow direction 39, as a result of which the valve points 24 is lifted off from the opening 22 in the diaphragm 13 so that a reduction of the vacuum in the control space 15 takes place owing to a further decreasing vacuum in the control space 16, and more particularly for such length of time until a new force equilibrium again exists. During this phase, the vacuum connection 18 remains closed by the valve plate 24. The reduction of the vacuum in the control space 15 thus effects by way of the adjusting drive 6 a movement of the turbine guide apparatus in the direction open position. The same is also true analogously for a reduction of the engine load. Also in this case the diaphragm packet now moves opposite the direction of arrow 39, now as a result of the decreasing vacuum in the control space 16, so that the control space 15 is also vented by way of the opening 22 up to the force equilibrium.

If the solenoid valve 34 is so shifted that the connection 20 at the pressure converter 8 is connected directly with the vacuum pump 29 (arrow 37), the diaphragm packet moves in the direction of the arrow 39, as a result of which the vacuum increases immediately in the control space 15, and more particularly for such length of time until equilibrium again prevails which, however, is now only the case when the maximum vacuum exists in the control space 15. This means for the turbo-guide apparatus of the turbocharger 2 that it moves into the closing position. The solenoid valve 34 assumes the previously described shifting position during idling (see FIG. 2 and associated description).

Figure 2:
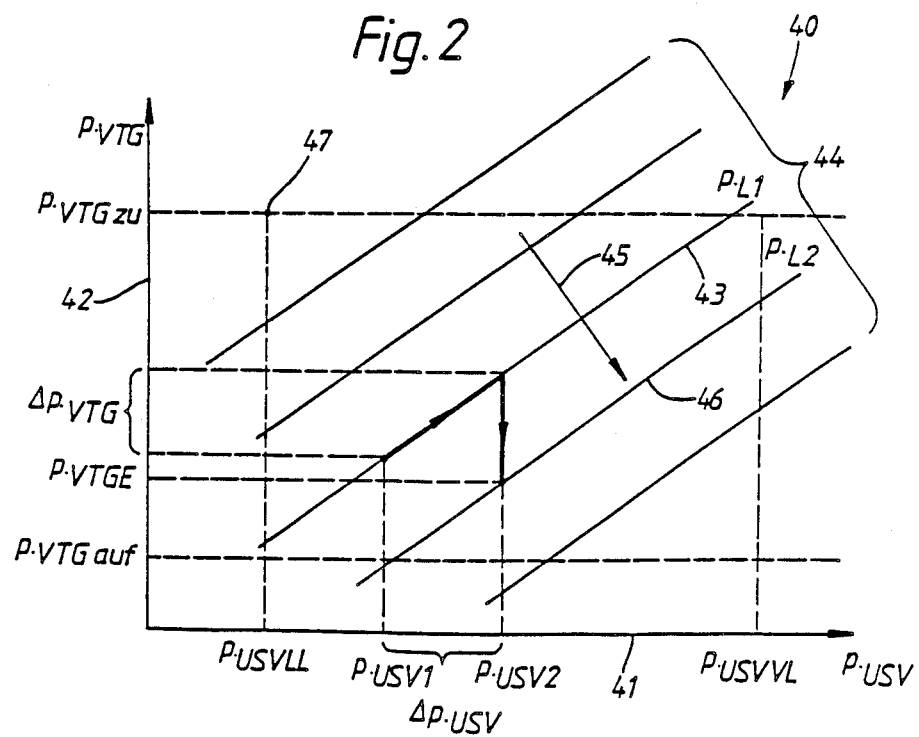
FIG. 2 illustrates in a diagram of $p_{VTG} = f(p_{USV}, p_L)$ the qualitative relationship between the vacuum signal $p_{USV}$ modulated as a function of the adjusting lever and the control vacuum $p_{VTG}$ for the control of the turbine guide apparatus, respectively, the adjusting drive actuating the same under the influence of the charging pressure $p_L$.

The operation of the pressure converter 8 is qualitatively illustrated in FIG. 2 in a diagram 40 $p_{VTG} = f(p_{USV}, p_L)$. The diagram illustrates along the abscissa 41 the vacuum pressure $p_{USV}$ modulated in dependence of the adjusting lever deflection by the vacuum control valve 31 which increases with an increasing adjusting lever deflection, whereby $p_{USVLL}$ exists for the vacuum during idling and $p_{USVVL}$ for that at full load.

The control vacuum $p_{VTG}$ for the control of the adjusting drive 6 actuating the turbine guide apparatus is plotted along the ordinate 42. In the diagram $p_{VTGauf}$ thereby designates the vacuum which brings the guide apparatus completely into the open position and $p_{VTGzu}$ that which brings the guide apparatus completely into the closed position.

During a positive load change $\Delta p_{USV}$ from $p_{USV1}$ to $p_{USV2}$ with an instantaneous charging pressure $p_{L1}$, a control vacuum increase by $\Delta P_{VTG}$ is initially effected in the vacuum converter 8 according to the characteristic curve 43 as a result of which the turbine guide apparatus depending on the slope of the characteristic curve 43, i.e., depending on the adjustment of the pressure converter 8, moves more or less in the direction toward closed position ($p_{VTGzu}$) whereby the optimum prerequisites for a rapid acceleration of the turbocharger 2 exist for this load change $\Delta p_{USV}$. However, with increasing duration, also the charging pressure $p_L$ will now increase as a result of the now increasing exhaust gas mass flow. This is taken into consideration in that the pressure converter 8 now matches the vacuum pressure $p_{VTG}$ to the respective charging pressure $p_L$ and more particularly, it reduces the same with increasing charging pressure $p_L$, as a result of which the turbine guide apparatus is again moved in the direction toward open position. The individual curves 44 are characteristic curves with a constant charging pressure $p_L$ whereby the latter increases in the direction of arrow 45.

The turbine guide apparatus is now moved in the direction open position for such length of time until at the load $p_{USV2}$ a charging pressure $p_{L2}$ (characteristic curve 46) which remains constant has now established itself. In this operating point, the guide apparatus is then in the position corresponding to the vacuum $p_{VTGE}$.

Analogously thereto with a negative load change, the guide apparatus is initially guided along a characteristic curve with constant charging pressure in the direction open position and subsequently, when the charging pressure again decreases as a result of the load reduction, is again guided in the direction closed position, and more particularly for such length of time until also in that case a stationary operating point is reached.

In order that no excessive time delays occur with a load change from idling, especially at relatively large load changes, at which the guide apparatus must be guided anyhow already quite close to the closed position or even completely into the closed position, it is appropriate to hold the turbine guide apparatus during idling in the closed position (point 47). This takes place in that the solenoid valve 34 is brought during idling into the shifting position connecting the connection 20 at the pressure converter 8 directly with the vacuum pump 29 (see FIG. 1, arrow 37).

In order to be able to superimpose the control pressure, it is also feasible to provide a venting valve in the line 7 between the pressure converter 8 and the adjusting drive 6 which can be opened in dependence on certain operating parameters of the internal combustion engine such as, for example, temperature, rotational speed, etc., as a result of which atmospheric pressure exists at the adjusting drive 6 and therewith the turbine guide apparatus is brought into the open position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for the load-dependent control of a turbocharger of an internal combustion engine, comprising turbine guide means, adjusting drive means, control means, the turbine guide means being operable to be moved in the direction toward an open position or in the direction toward a closed position by way of the adjusting drive means controllable by the control means in dependence on a charging pressure signal, the control means being operable to initially guide the turbine guide means during a positive load change according to a first predetermined characteristic curve in the direction toward a closed position and subsequently according to a second predetermined characteristic curve again in the direction toward an open position in dependence on the charging pressure increase conditioned on load increase, wherein the internal combustion engine includes an injection pump having an adjusting lever, a vacuum pump, pressure converter means which receives by way of a first connection a first vacuum signal produced by the vacuum pump, by way of a second connection, a second vacuum signal which is modulated in dependence on the position of the adjusting lever, and by way of a third connection a charging pressure signal, the pressure converter means being operable in dependence on the applied signals to produce a control vacuum for the control of an aggregate arranged in a vehicle, and valve means arranged in a line feeding the second vacuum signal to the pressure converter means, said valve means being operable to close said last-mentioned line and at the same time to establish a connection between the vacuum pump and the second connection at the pressure converter means, the adjusting drive means being acted upon by the control vacuum.

2. An arrangement according to claim 1, wherein the control vacuum controls the turbine guide means in such a manner that with an increasing load, the turbine guide means is displaced in the direction toward a closed position and with an increasing charging pressure in the direction toward an open position, and that the turbine guide means is in the at least nearly closed position during idling.

3. An arrangement according to claim 2, wherein the adjusting drive means is operatively connected with the pressure converter means by way of a pneumatic line.

4. An arrangement according to claim 3, wherein the turbine guide means is displaced in the direction toward a closed position with an increasing control vacuum.

5. An arrangement according to claim 1, wherein the adjusting drive means is operatively connected with the pressure converter means by way of a pneumatic line.

6. An arrangement according to claim 1, wherein the turbine guide means is displaced in the direction toward a closed position with an increasing control vacuum.

7. An arrangement according to claim 6, wherein the adjusting drive means is operatively connected with the pressure converter means by way of a pneumatic line.

8. A method for the load-dependent control of a turbocharger which is arranged at an internal combustion engine and includes a guide apparatus which is adapted to be moved in the direction toward an open position or in the direction toward a closed position by way of an adjusting drive controllable by a control device in dependence on charging pressure signals, comprising the steps of guiding the turbine guide apparatus in case of a positive load change initially according to a first predetermined characteristic curve in the direction toward a closed position and subsequently again in the direction toward an open position according to a second predetermined characteristic curve in dependence on the charging pressure increase conditioned on load increase, wherein the internal combustion engine includes an injection pump having an adjusting lever, a vacuum pump, pressure converter means which receives by way of a first connection a first vacuum signal produced by the vacuum pump, by way of a second connection, a second vacuum signal which is modulated in dependence on the position of the adjusting lever, and by way of a third connection a charging pressure signal, the pressure converter means being operable in dependence on the applied signals to produce a control vacuum for the control of an aggregate arranged in a vehicle, and valve means arranged in a line feeding the second vacuum signal to the pressure converter means, said valve means being operable to close said last-mentioned line and at the same time to establish a connection between the vacuum pump and the second connection at the pressure converter means, the adjusting drive means being acted upon by the control vacuum.

9. A method according to claim 8, wherein the control vacuum controls the turbine guide means in such a manner that with an increasing load, the turbine guide means is displaced in the direction toward a closed position and with an increasing charging pressure in the direction toward an open position, and that the turbine guide means is in the at least nearly closed position during idling.

10. A method according to claim 9, wherein the adjusting drive means is operatively connected with the pressure converter means by way of a pneumatic line.

11. A method according to claim 10, wherein the turbine guide means is displaced in the direction toward a closed position with an increasing control vacuum.

12. A method according to claim 8, wherein the adjusting drive means is operatively connected with the pressure converter means by way of a pneumatic line.

13. A method according to claim 8, wherein the turbine guide means is displaced in the direction toward a closed position with an increasing control vacuum.

14. A method according to claim 13, wherein the adjusting drive means is operatively connected with the pressure converter means by way of a pneumatic line.

* * * * *